US011447163B2

(12) United States Patent
Khan

(10) Patent No.: US 11,447,163 B2
(45) Date of Patent: Sep. 20, 2022

(54) TRAIN WITH DUAL DISTANCE COUNTERS

(71) Applicant: Progress Rail Locomotive Inc., LaGrange, IL (US)

(72) Inventor: Asim R. Khan, Naperville, IL (US)

(73) Assignee: Progress Rail Locomotive Inc., LaGrange, IL (US)

( * ) Notice: Subject to any disclaimer, the term of this patent is extended or adjusted under 35 U.S.C. 154(b) by 703 days.

(21) Appl. No.: 16/371,783

(22) Filed: Apr. 1, 2019

(65) Prior Publication Data

US 2020/0307659 A1    Oct. 1, 2020

(51) Int. Cl.
    *B61L 1/16*      (2006.01)
    *G01B 21/06*      (2006.01)
    *B61L 15/00*      (2006.01)
    *B61L 21/06*      (2006.01)

(52) U.S. Cl.
CPC .............. *B61L 1/16* (2013.01); *B61L 15/009* (2013.01); *G01B 21/06* (2013.01); *B61L 21/06* (2013.01)

(58) Field of Classification Search
CPC .......... B61L 1/16; B61L 15/009; B61L 21/06; G01B 21/06
See application file for complete search history.

(56) References Cited

U.S. PATENT DOCUMENTS

| 3,573,441 | A | * | 4/1971 | Glazar | ................... | G01B 21/06 |
| | | | | | | 702/163 |
| 5,483,520 | A | | 1/1996 | Eychenne et al. | | |
| 2007/0137514 | A1 | * | 6/2007 | Kumar | .................. | F02D 41/021 |
| | | | | | | 105/26.05 |
| 2012/0136621 | A1 | * | 5/2012 | Inomata | ................ | G01S 13/605 |
| | | | | | | 702/143 |
| 2018/0237042 | A1 | * | 8/2018 | Angel | ..................... | B61C 17/12 |

FOREIGN PATENT DOCUMENTS

| CN | 105292184 B | 8/2017 |
| DE | 102016112368 A1 | 1/2018 |
| GB | 1117123 A | 6/1968 |
| JP | 2010120544 A | 6/2010 |
| RU | 2004120622 A | 1/2006 |

OTHER PUBLICATIONS

Tom Danneman "Tracking train lengths" Trains Magazine, Nov. 1, 2017 (1 page).

* cited by examiner

*Primary Examiner* — Robert J McCarry, Jr.
(74) *Attorney, Agent, or Firm* — Bookoff McAndrews PLLC

(57) ABSTRACT

A control system for a train includes a display unit providing a first display including a plurality of distance counters simultaneously, wherein the plurality of distance counters includes at least a count up counter and a countdown counter. The control system further includes a controller configured to continually increment or decrement at least one of the count up or countdown counters based at least in part on a track distance covered by the train.

20 Claims, 10 Drawing Sheets

TRAIN WITH DUAL DISTANCE COUNTERS

TECHNICAL FIELD

The present disclosure relates generally to train systems, and more particularly, to train systems having dual distance counters.

BACKGROUND

Some conventional control systems for trains include train length countdown counters. While such counters are important in determining when a train has fully passed a location, such counters have limitations. For example, by only providing a countdown counter based on a train length, a train operator may need to preform calculations at critical moments in a trip to determine when the train has reached an upcoming location of the run. Further, such train length countdown counters may lack the flexibility to adjust to different train location situations.

U.S. Pat. No. 3,573,441 to Glazar discloses an apparatus for measuring the length of a moving railroad train. The system includes sensors mounted on a rail of the track in relatively close proximity to one another, and two counting circuits, each of which is operatively connected to the sensors and counts the pulses from an associated fixed frequency pulse generator. While the '441 patent addresses train length determinations, the patent does not disclose train length count up or countdown counters. Accordingly, the features of the '441 do not, for example, assist the train operator in determining when a train has reached an upcoming location of the run.

The systems and methods of the present disclosure may address one or more of the problems set forth above and/or other problems in the art. The scope of the current disclosure, however, is defined by the attached claims, and not by the ability to solve any specific problem.

SUMMARY

In accordance with an aspect of the present disclosure, a control system for a train includes a display unit providing a first display including a plurality of distance counters simultaneously, wherein the plurality of distance counters includes at least a count up counter and a countdown counter. The control system further includes a controller configured to continually increment or decrement at least one of the count up or countdown counters based at least in part on a track distance covered by the train.

In accordance with another aspect of the present disclosure, a control system of a train having a train length, includes a display unit, and at least one controller configured to load and operate a plurality of displays on the display unit. The plurality of displays including at least a first display configured to simultaneously display a count up distance counter, a countdown distance counter, a first icon for activating the count up distance counter, a second icon for activating the countdown distance counter, a third icon for resetting the count up distance counter, a fourth icon for resetting the countdown distance counter. The control system further configured to, in response to detecting an input at the third icon, reset the count value of the count up distance counter to a default value; and, in response to detecting an input at the fourth icon, reset the count value of the countdown distance counter to the train length.

In accordance with yet another aspect of the present disclosure, a method for operating a train control system includes displaying a first display, wherein the first display includes a count up counter, a countdown counter, a first icon for activating the count up counter, a second icon for activating the countdown counter, a third icon for resetting the count up counter, a fourth icon for resetting the countdown counter. The method further includes, in response to detecting an input at the first icon, continually increment the count value of the count up counter, based on a track distance covered by the train after the detecting of the input at the first icon; in response to detecting an input at the second icon, continually decrement the count value of the countdown counter based on a present train length and a track distance covered by the train after the detecting of the input at the third icon; in response to detecting an input at the third icon, reset the count value of the count up counter to a default value; and in response to detecting an input at the fourth icon, reset the count value of the countdown counter to the present train length.

BRIEF DESCRIPTION OF THE DRAWINGS

The accompanying drawings, which are incorporated in and constitute a part of this specification, illustrate various exemplary embodiments and together with the description, serve to explain the principles of the disclosure.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion such that a process, method, article, or apparatus that comprises a list of elements does not include only those elements, but may include other elements not expressly listed or inherent to such a process, method, article, or apparatus. Further, relative terms, such as, for example, "about," "substantially," "generally," and "approximately" are used to indicate a possible variation of ±10% in a stated value.

Figure 1:
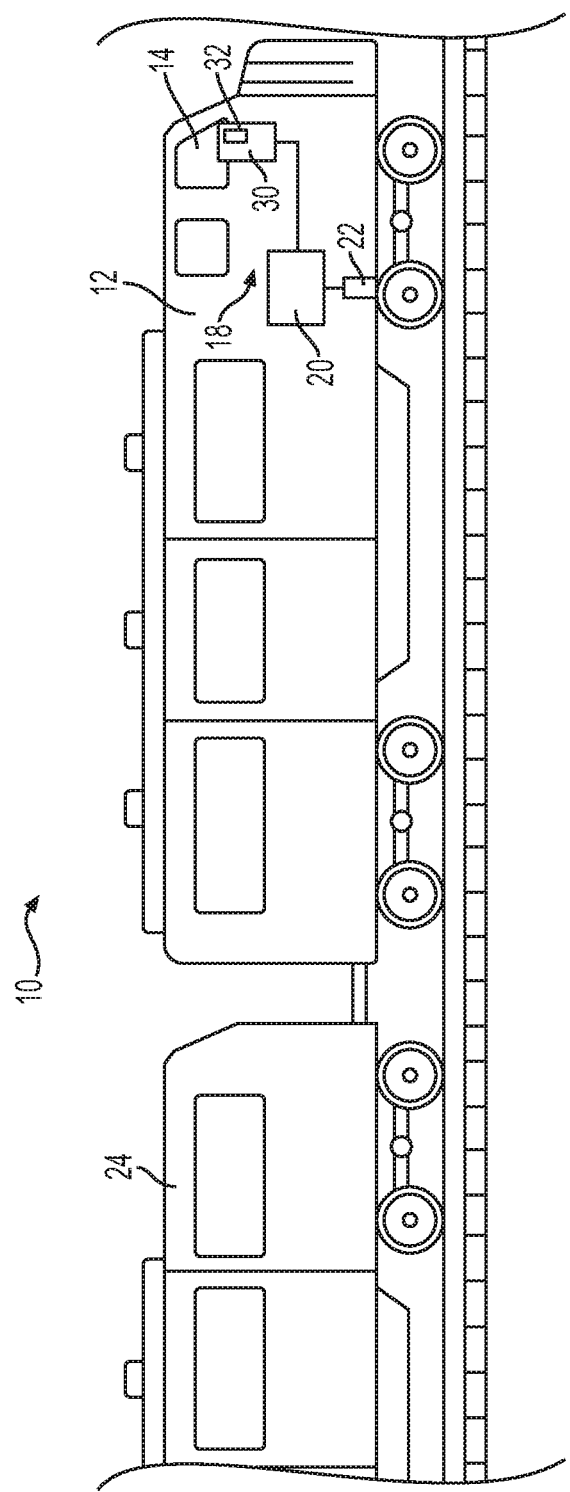
FIG. 1 illustrates a train including a control system with dual distance counters according to aspects of the disclosure.
Figure 2:
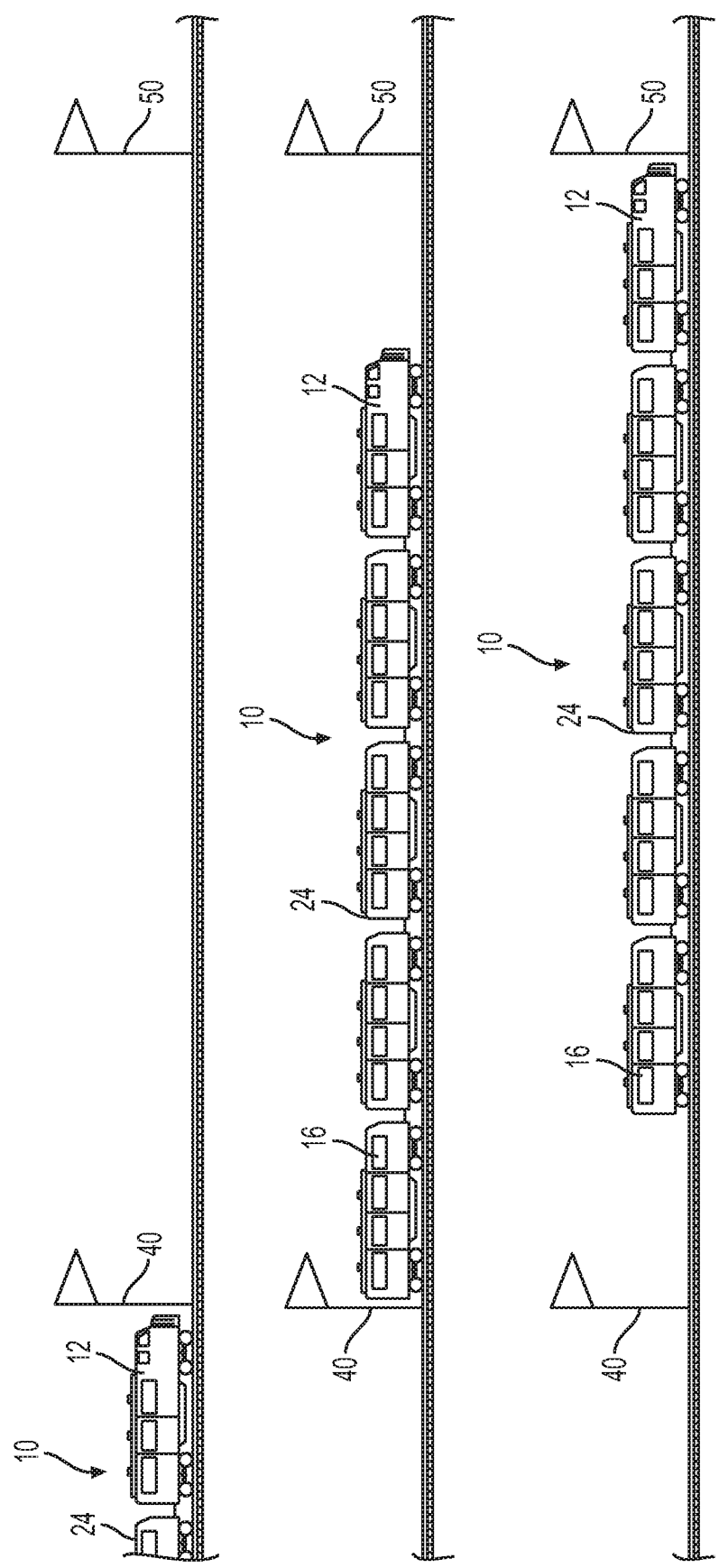
FIG. 2 illustrates situational uses of the dual distance counters of the train of FIG. 1.

FIGS. 1 and 2 illustrate a train 10 including a front car 12, a rear car 16 (FIG. 2), and intermediate cars 24. The front car 12 may include an operator station 14 and a control system 18 including a controller 20, one or more travel sensors 22, and an operator interface 30.

Train 10 may be any type of train, such as a freight or passenger train, and can include any type or number of cars and locomotives. For example, front car 12 and/or rear car 16 may be a locomotive powering the train 10. The intermediate cars 24 may be passenger or freight cars, or any other type of train cars. The operator station 14 may be of any conventional design and may include the operator interface 30 of control system 18. The operator interface may include one or more display units 32, control panels, and/or other control devices. The one or more display units 32 may include a graphical user interface as will be described in more detail below. The control panels or other control devices of the operator interface 30 may include any one or more of keyboards, buttons, switches, dials, joysticks, and pedals, etc.

The controller 20 of control system 18 may include any appropriate hardware, software, firmware, etc. to carry out the methods described in this disclosure. For, example, controller 20 may include one or more processors, memory, communication systems, and/or other appropriate hardware. The processors may be, for example, a single or multi-core processor, a digital signal processor, microcontroller, a general purpose central processing unit (CPU), and/or other conventional processor or processing/controlling circuit or controller. The memory may include, for example, read-only memory (ROM), random access memory (RAM), flash or other removable memory, or any other appropriate and conventional memory. The communication systems used in or with controller 20 may include, for example, any conventional wired and/or wireless communication systems such as Ethernet, Bluetooth, and/or wireless local area network (WLAN) type systems. Additionally, controller 20 may be configured to send and receive data or signals from various sensors, and other hardware associated with control system 18. For example, controller 20 may be coupled to send and receive signals to and from operator interface 30, including display unit 32, and one or more travel sensors 22.

Travel sensor 22 may be any conventional sensor or system configured to provide to controller 20 data indicative of a distance traveled by the train 10. For example, travel sensor 22 may be a speed sensor or tachometer that senses the rotational speed of a wheel, gearbox, motor, or other component of the train 10 that is indicative of the movement of train 10. Such speed sensors can be a conventional hall effect sensor, variable reluctance sensor, eddy current sensor, or any other conventional speed sensor. Further, travel sensor 22 may be any other type of sensor physically located on train 10, or otherwise associated with train 10, from which a distance traveled by the train can be derived. Controller 20 may be configured in any appropriate way to convert the data from travel sensor 22 to a distance traveled by train 10. For example, when travel sensor 22 measures wheel rotations, controller 20 can determine a distance traveled by the train 10 by multiplying the sensed wheel rotations by the wheel circumference.

FIG. 2 depicts the situational use of count up and countdown counters in accordance with the present disclosure. Looking at the top portion of FIG. 2, a front car 12 of train 10 is located at a first marker 40. In a first situation as shown in the bottom portion of FIG. 2, an operator of train 10 may want to know when the front car 12 of train 10 will reach a second marker 50, where second marker 50 may represent a known distance where the train is required to take an action, such as be at a reduced speed. Using either a count up or countdown counter and the known distance, the train operator can set either counter as a notification of when the front car 12 reaches second marker 50. Using a count up counter, the counter would be actuated (with a zero value) and a notification would be provided when the counter reaches the known distance to second marker 50. Using a countdown counter, the counter would be actuated (with the known distance to second marker 50 entered) and a notification would be provided when the counter reaches zero.

In a second situation as shown in the middle portion of FIG. 2, an operator of train 10 may want to know when the rear car 16 has passed the first marker 40. In such a situation, the train operator may want to know when the train 10 has fully cleared a particular location on the track such as a railroad crossing. Using either a count up or countdown counter and the known length of the train, the train operator can set either counter as a notification of when the rear car 16 passes the first marker 40. Using a count up counter, the counter would be actuated (with a zero value) and the notification would be provided when the counter reaches the known length of train 10. Using a countdown counter, the counter would be actuated (with the known length of train 10 entered) and the notification would be provided when the counter reaches zero.

Figure 3:
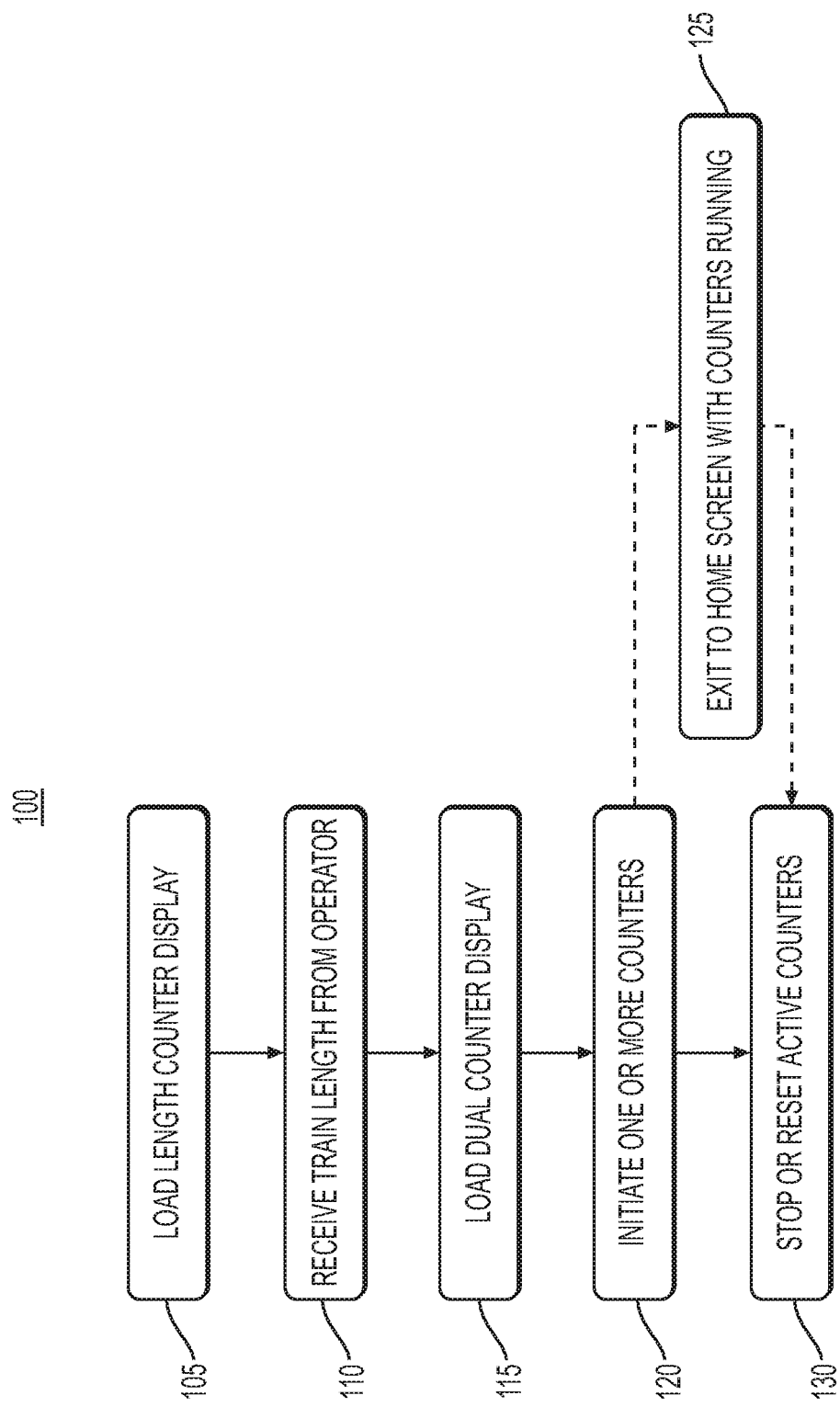
FIG. 3 illustrates an overview of the various aspects of the operation of the dual distance counters of the train of FIG. 1.

FIG. 3 provides an overview of the various aspects of an operation 100 of the dual distance counters in accordance with the present disclosure. In particular, operation 100 includes (1) loading a train length display on display unit 32 (step 105) and the associated operation of receiving a train length value from operator (step 110); and (2) loading a dual counters display of display unit 32 (step 115) and associated initiation of one or more counters (step 120), an exit to home screen with counters running (step 125), and/or a stop or reset active counters (step 130). This operation 100 of dual counters may be implemented to show various different displays or screens (e.g., displays 400-700 of FIGS. 4-7) on display unit 32 in communication with the controller 20, each display including icons to navigate between the different displays. As used herein, an icon may be any selection mechanism at which an operator may provide an input (e.g., a touch-screen icon, a hard key, a soft key, a push button, or an icon responsive to a mouse click, etc.) for detection by the controller 20.

Figure 4:
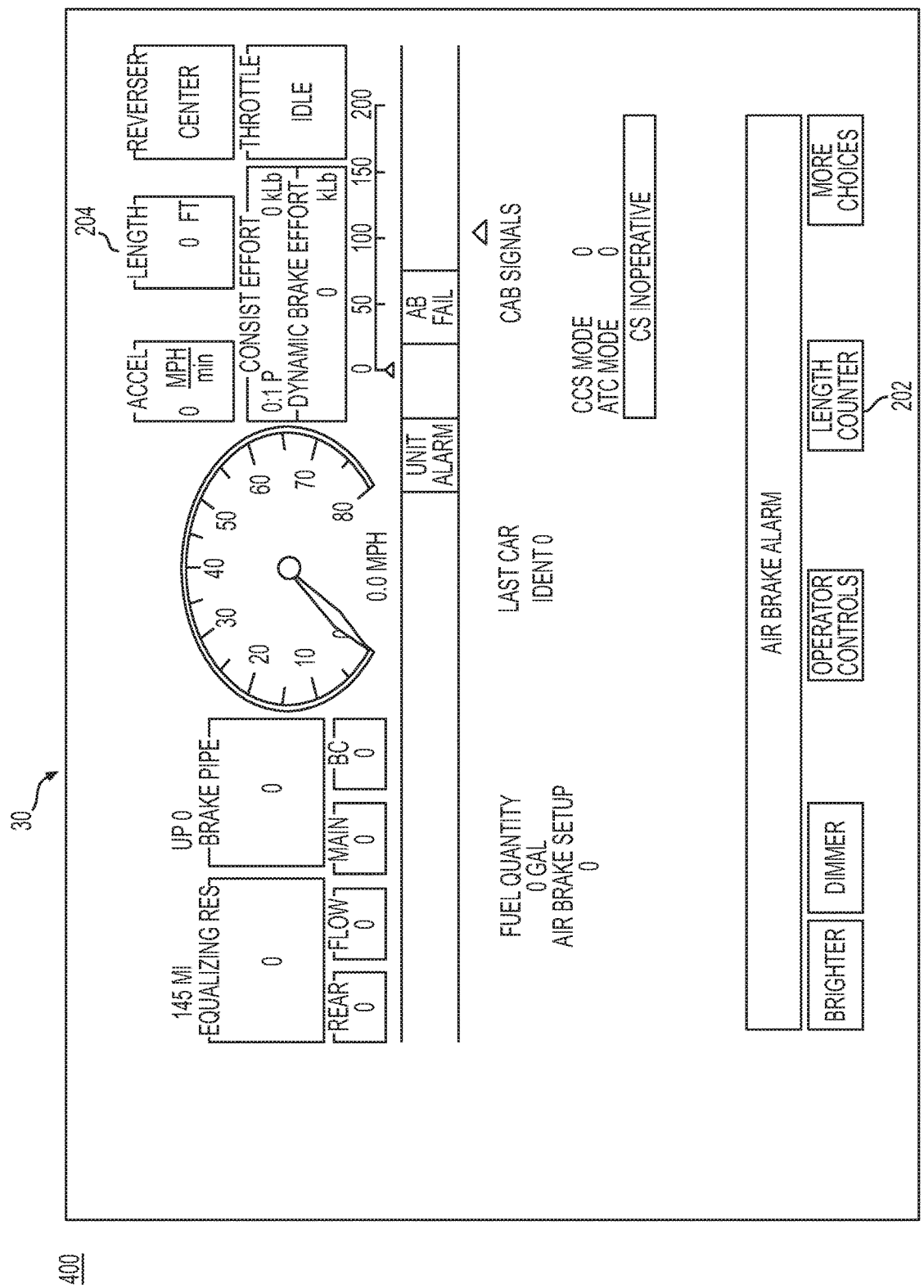
FIGS. 4-10 illustrate various operator interface displays of the control system of the train of FIG. 1.

Starting from FIG. 4, and a display or screen 400 of display unit 32 of operator interface 30, controller 20 may initiate or load the length counter display (step 105) in response to detecting an input at a length counter setting icon 202. Display or screen 400 will be referred to herein as a home screen, but it is understood, that the display 400 may be one of several home screens of display unit 32 of operator interface 30. In response to initiating the loading length counter display (step 105), the controller may load operator interface display 500 of FIG. 5, which continually displays a currently stored train length at the length viewer 204 located at a preconfigured position of the display, such as the top right corner of display 500. Additionally, display 500 may include a change length icon 206, to allow an operator to input or update the value of the currently stored train length to a new value for storage and retrieval.

Figure 10:
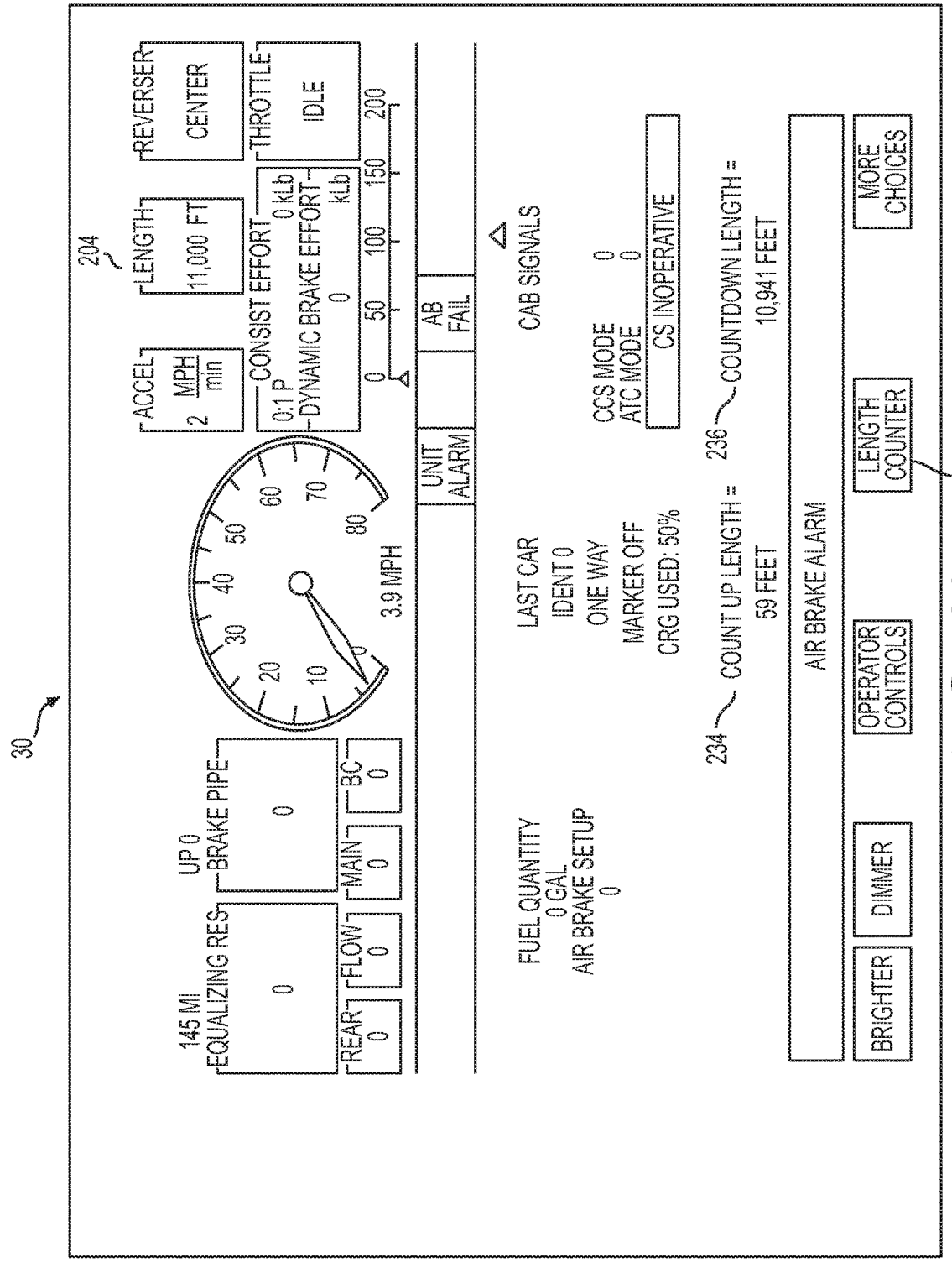

In response to detecting an input at the change length icon 206, the controller 20 may receive a train length value from the operator (step 110). As a response to the input at the change length icon 206, a length input interface (not shown) may be loaded as, for example, a new full-screen display replacing display 500 on the display unit 32, a pop-up display loaded at least partially on top of the display 500, or a display loaded on a different display unit 32 in communication with the display unit 32 showing display 500. At the length input interface, an operator may enter a new value to replace the previously stored train length, via any input device (e.g., touch screen, keyboard, mouse, hard key, soft key, push-button, joystick, microphone, etc.) in communication with the controller 20. Such an entered length may be, for example, the length of the train (e.g., the overall length of the train, optionally adjusted using a modifier and/or a margin of error set by the operator), or any distance value sought to be counted down from. FIG. 10 depicts home screen display 400 with a value of 11,000 feet stored as the train length. Alternatively, an operator may proceed to the load dual counter display (step 115) without making any changes to the currently stored train length. Additionally, the controller 20 may display an exit icon 210 at display 500, the exit icon 210 being configured to respond by exiting to the previous screen (e.g., display 400 of FIG. 4) or to an alternative home screen.

Figure 5:
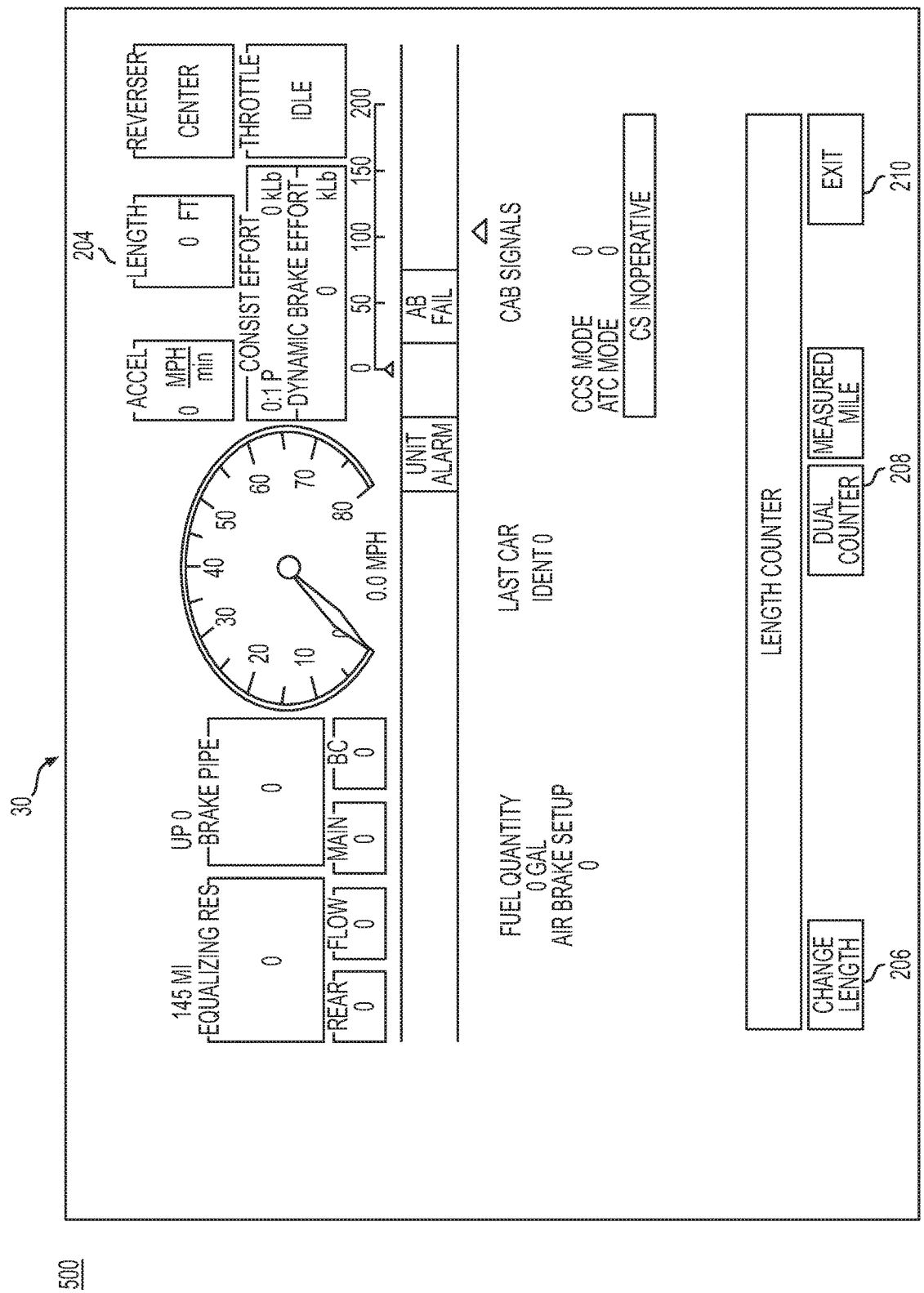
Figure 6:
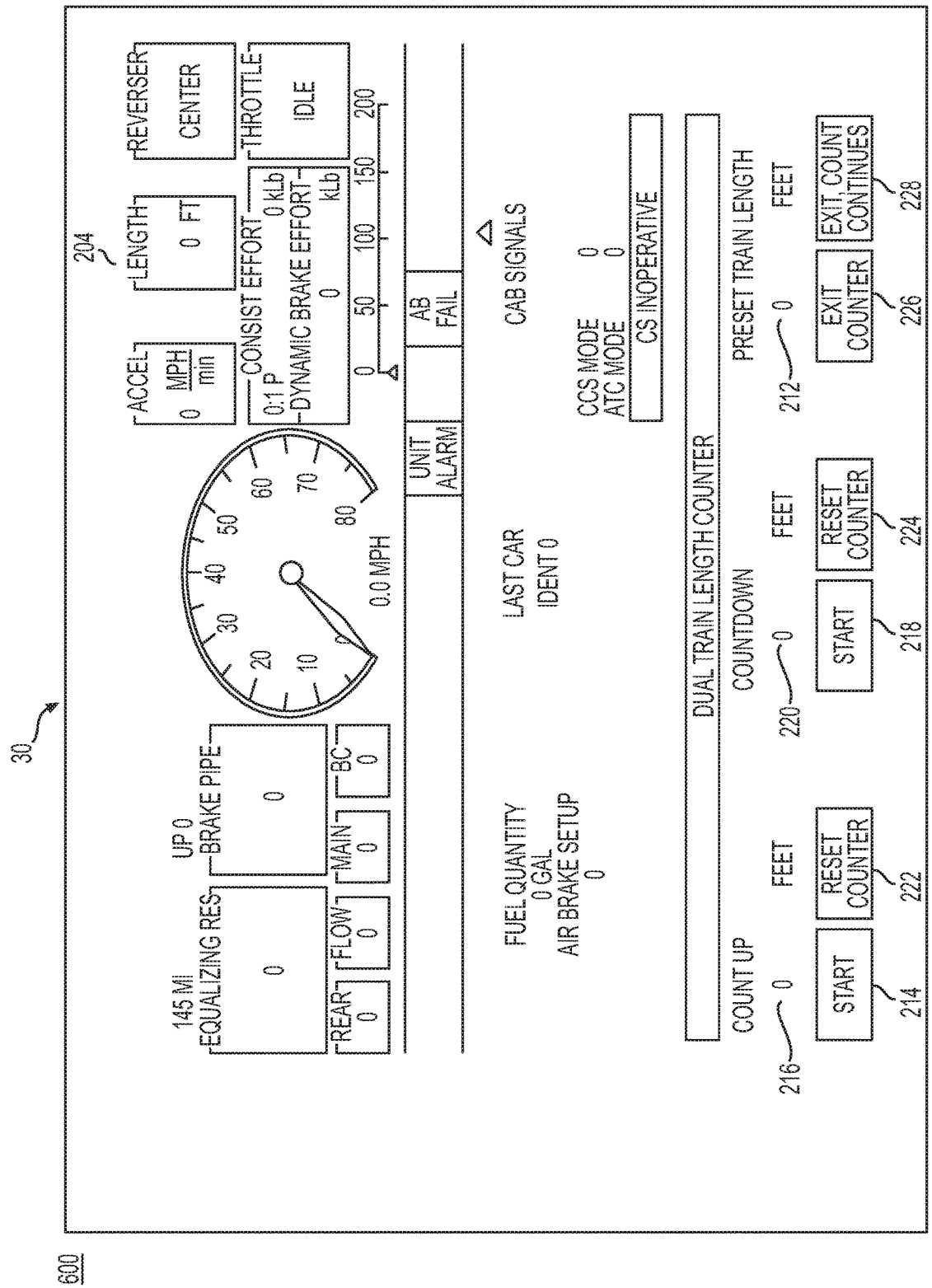
Figure 7:
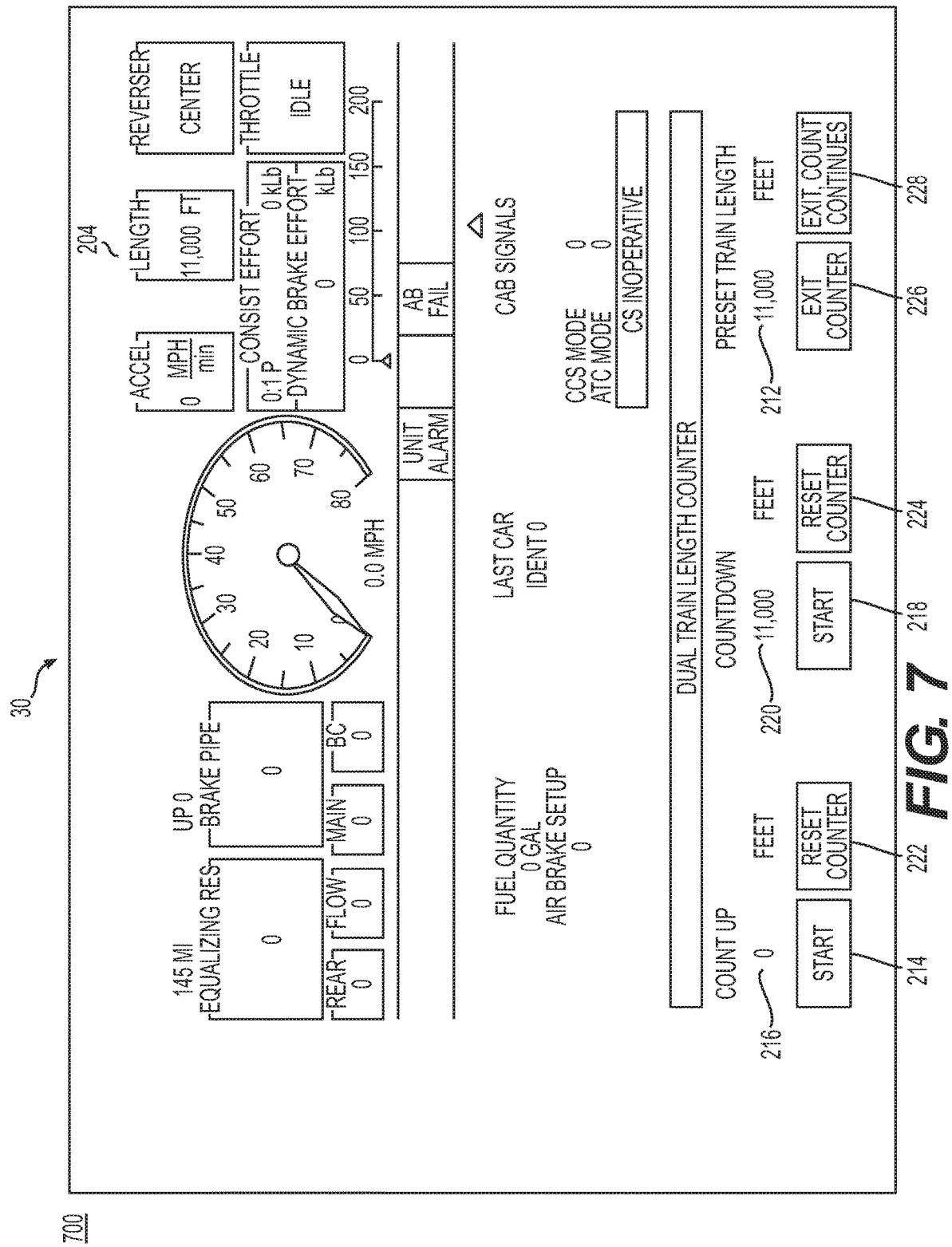

In response to detecting an input at a dual counter icon 208 on display 500 of FIG. 5, the controller 20 may initiate or load dual counter display (step 115), by loading a dual counter display (e.g., display 600 of FIG. 6). Display 600 may include the length viewer 204 at a preconfigured position of the display, continually displaying the currently stored train length value. Additionally, display 600 may include a preset train length viewer 212, which may also display the currently stored train length in order to, for example, provide an operator with enhanced visibility of the preset train length while using the features of the dual distance counters.

Display 600 may simultaneously show a count up counter 216, and a countdown counter 220 on the same screen, as shown in FIG. 6. The count up counter 216 and the countdown counter 220 may be in initialized states, unless the latest detected event at the respective counter was an activation or a stop without reset. At initialized states, the count up counter 216 and the countdown counter 220 may each display its respectively stored default value. For example, the controller 20 may set a preconfigured value (e.g., "0") stored as the default value of the count up counter 216, and set the currently stored train length as the default value of the countdown counter 220. For example, display 700 of FIG. 7 displays the default value of the count up counter 216 as "0" and the default value of the countdown counter 220 as 11,000 feet. In this example, because the currently stored train length of the countdown counter 220 is set as 11,000 feet (e.g., an operator-provided value (step 110)), the default value of the countdown counter 220, the preset train length viewer 212, and the length viewer 204 may all display 11,000 feet in display 700.

In addition, display 600 may display a count up start icon 214 and a count up reset icon 222 for start and reset operations of the count up counter 216, and likewise, display a countdown start icon 218 and a count up reset icon 224 for start and reset operations of the countdown counter 220.

Figure 8:
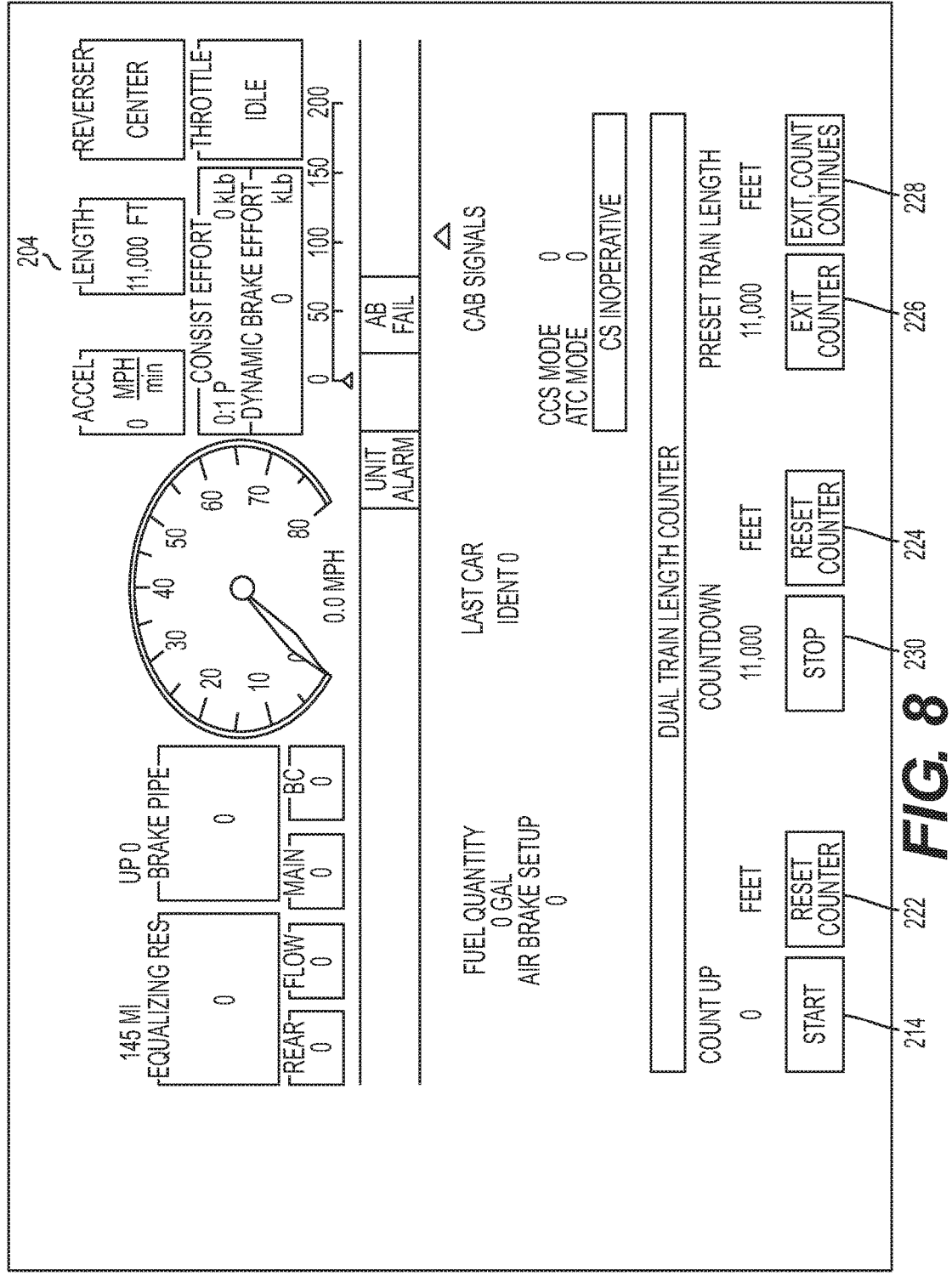

Initiation of one or more counters (step 120 of FIG. 3) may begin immediately in response to detecting an activation of any counter which has been loaded on the user interface. For example, in response to detecting an input at the countdown start icon 218, the countdown counter 220 may be activated (e.g., at a default value or a paused value) and start continually decrementing the count value based on the amount of track distance covered by the train, as determined, for example, by travel sensor 22 and controller 20 as discussed above. Additionally, as soon as the countdown counter 220 is activated, the controller 20 may replace the count down start icon 218 to a countdown stop icon 230, as shown in FIG. 8.

Figure 9:
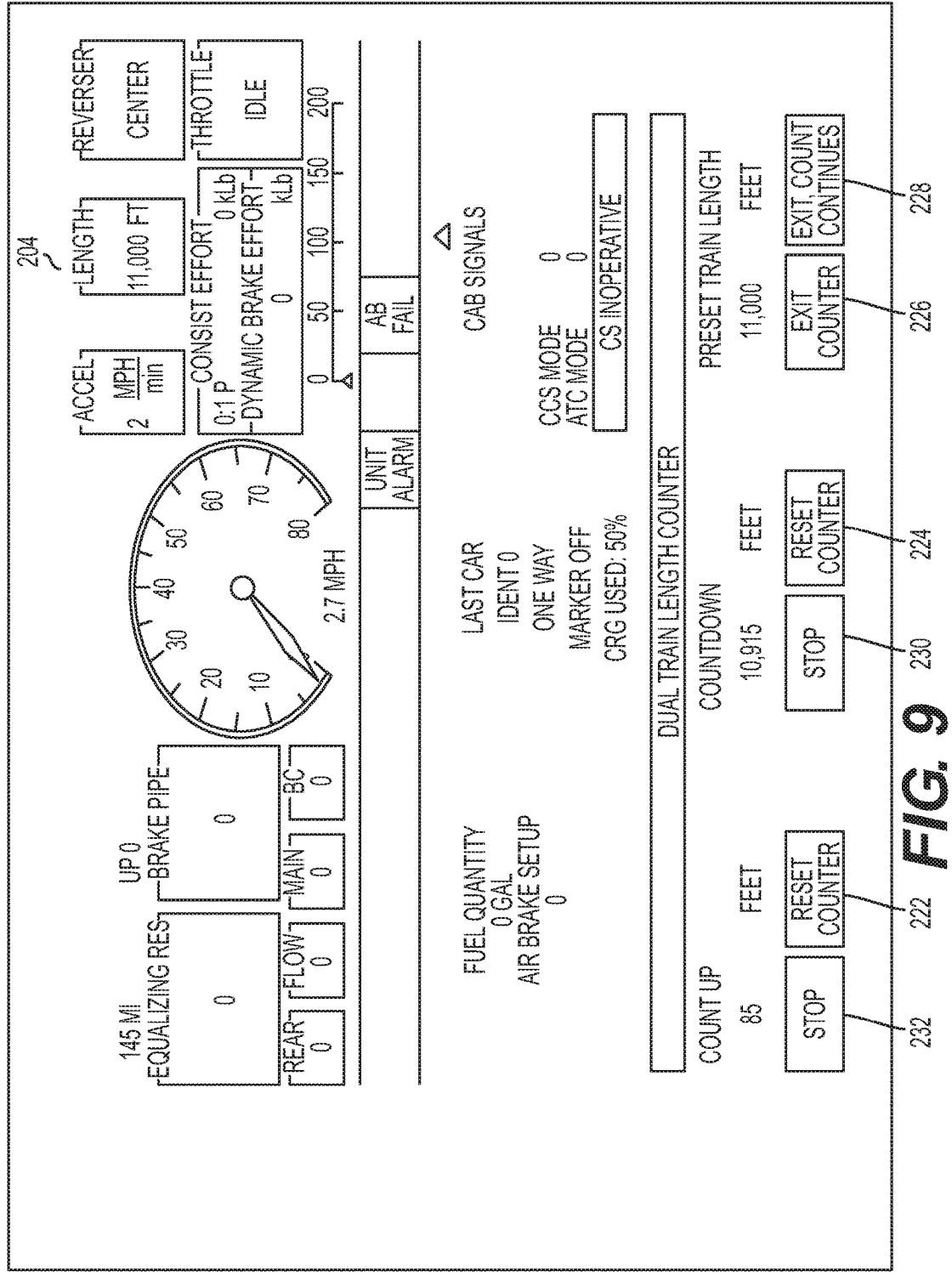

Similarly, in response to detecting an input at the count up start icon 214, the count up counter 216 may be activated (e.g., at a default value, or a paused value) and start continually incrementing the count value based on the amount of track distance covered by the train as determined, for example, by travel sensor 22 and controller 20 as discussed above. In response to activating the count up counter 216, the controller may also change the count up start icon 214 to a count up stop icon 232, as shown in FIG. 9. In addition, the count up counter 216 and the countdown counter 220 may both be active simultaneously, depending on the sequence of actions taken by the operator. For example, if the operator first activated the count up counter 216, and activated the countdown counter 220 without stopping the count up counter 216, then both counters may be active simultaneously until a further action is taken on either counter.

The controller 20 may provide for an exit to a home screen such as display 400 of FIG. 4, with counters running (step 125 of FIG. 3), in response to detecting an input at the exit—count continues icon 228 shown in FIGS. 6-9. In response to detecting such an input, the controller 20 may load the home screen display as shown in FIG. 10 which may provide a counter viewer section at a preconfigured position therein, the counter viewer section may include a home screen count up viewer 234 and a home screen countdown viewer 236. The home screen count up viewer 234 and the home screen countdown viewer 236 may both be displayed within the counter viewer section, regardless of each counter's state (e.g., a state of being initialized, active, or stopped). Alternatively, the counter viewer section may only display one or more counters that are active at the moment that the exit—count continues icon 228 was activated. For example, the counter viewer section may be configured to load only the home screen count up viewer 234, in response to detecting an input at the exit—count continues icon 228 while only the count up counter 216 was actively running at the dual counter display (e.g., FIGS. 6-9).

In both implementations of the counter viewer section, the controller 20 may be configured to continually increment or decrement the value of the active counter(s) at the counter viewer section of the home screen (FIG. 10), until further actions are taken to stop or reset one or more of counters. In order for an operator at the home screen display of FIG. 10 to take the further actions on the one or more counters, an operator may activate the length counter icon 202 to load the dual counter display (e.g., FIGS. 6-9). The further actions taken by the operator to stop or reset one or more of the counters in the dual counter display are described below with respect to the stop or reset active counters step 130 of FIG. 3.

The stop or reset active counters step 130 may begin immediately in response to detecting that all active counters have been either reset (e.g., via input at count up reset icon 222 and/or countdown reset icon 224), or stopped (e.g., via input at count up stop icon 232, or countdown stop icon 230), at a dual counter display (e.g., FIGS. 6-9). In addition to the counter-specific icons (e.g., count up stop icon 232 of FIG. 9), the user interface 30 may be configured to display an exit counter icon 226 as an icon at the dual counter display (e.g., FIGS. 6-9). In response to detecting an input at the exit counter icon 226, the controller may be configured to stop all active counters from running, pause the count values at the moment the exit counter icon 226 was activated, and store each of those paused count values as the respective count values until the value is reset (e.g., detecting an input at the count up reset icon 222 or the countdown reset icon 224). Alternatively, in response to detecting an input at the exit counter icon 226, the controller may be configured to stop all active counters from running, and initialize all counters by restoring all count values to the counters' default values.

INDUSTRIAL APPLICABILITY

The aspects of the present disclosure may be used in any train system, and may assist in determining distances traveled or to-be-traveled by a train.

FIGS. 4-10 are provided merely as example displays or screens on display unit 32 of operator interface 30. Other examples (e.g., differently arranged displays) are possible and may differ in arrangement, form, or design from what was described with regard to FIGS. 4-10.

Referring to FIG. 2, when a front car 12 of train 10 is located at a first marker 40, the disclosed control system 18 with operation 100 (FIG. 3) of dual distance counters allows an operator to both: (1) use a count up counter 216 to determine when the train has reached a known distance, such as a location 50 of an upcoming reduced speed zone, and (2) use a countdown counter 220 to determine whether the rear car 16 has fully cleared a particular location, such as a railroad crossing. The control system 18 allows the flexibility to operate both the count up and countdown counters 216, 220 at the same time, or alternatively; allows for monitoring and continuing the counters while viewing different screens such as a home screen 400 of the operator interface 30; and allows independent control of the starting, stopping and restarting of the counters 216, 220. In addition to the flexibility such a control system 18 provides, the control system 18 with operation 100 of dual distance counters may help to avoid manual calculations by the operator in determining when the train will be at a particular location.

It will be apparent to those skilled in the art that various modifications and variations can be made to the disclosed system without departing from the scope of the disclosure. Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A control system for a train, comprising:
    a display unit providing a first display including a plurality of distance counters simultaneously, wherein the plurality of distance counters includes at least a count up counter and a countdown counter, wherein the count up counter counts a distance traveled by the train, and wherein the countdown counter counts down based on a distance to-be-traveled by the train; and
    a controller configured to continually increment or decrement at least one of the count up or countdown counters based at least in part on a track distance covered by the train.

2. The control system of claim 1, wherein the first display includes a first icon for activating the count up counter, and wherein the controller is configured to continually increment a count value of the count up counter in response to detecting an input at the first icon.

3. The control system of claim 2, wherein the controller is configured to continually increment the count value of the count up counter based on a track distance covered by the train after detecting the input at the first icon.

4. The control system of claim 3, wherein the first display additionally displays a second icon for activating the countdown counter, and wherein the controller is configured to continually decrement a count value of the countdown counter in response to detecting an input at the second icon.

5. The control system of claim 4, wherein the controller is configured to continually decrement the count value of the countdown counter based on a preset train length and a track distance covered by the train after detecting the input at the second icon.

6. The control system of claim 5, wherein the display additionally displays a third icon for resetting the count up counter and a fourth icon for resetting the countdown counter, and wherein the controller is further configured to reset the count value of the count up counter to a default value in response to detecting an input at the second icon, and to reset the count value of the countdown counter to the preset train length in response to detecting an input at the fourth icon.

7. The control system of claim 6, wherein the first display additionally displays a fifth icon, and wherein the controller is further configured to remove the first display from the display unit in response to detecting an input at the fifth icon.

8. The control system of claim 7, wherein, upon removing the first display, the controller continues to increment or decrement at least one of the count up and countdown counters.

9. The control system of claim 8, wherein the display unit is further configured, in response to detecting the input at the fifth icon, to load a second display including a home screen including a home screen count up counter and a home screen countdown counter.

10. The control system of claim 9, wherein the home screen count up counter is configured to resume the continual incrementing of the count up counter in response to determining that the count up counter was activated at the time of the input at the fifth icon, and wherein the home screen countdown counter is configured to resume the continual decrementing of the countdown counter in response to determining that the countdown counter was activated at the time of the input at the fifth icon.

11. A control system of a train having a train length, the control system comprising:
    a display unit; and
    at least one controller configured to load and operate a plurality of displays on the display unit, the plurality of displays including at least a first display configured to:
        simultaneously display a count up distance counter that counts up a distance traveled by the train, a countdown distance counter that counts down a distance to-be-traveled by the train, a first icon for activating the count up distance counter, a second icon for activating the countdown distance counter, a third icon for resetting the count up distance counter, and a fourth icon for resetting the countdown distance counter;
        in response to detecting an input at the third icon, reset a count value of the count up distance counter to a default value; and
        in response to detecting an input at the fourth icon, reset a count value of the countdown distance counter to the train length.

12. The control system of claim 11, wherein the first display is additionally configured to display a fifth icon, and wherein the at least one controller is further configured to remove the first display from the display unit in response to detecting an input at the fifth icon.

13. The control system of claim 12, wherein, upon removing the first display, the at least one controller continues to increment or decrement at least one of the count up and countdown distance counters.

14. The control system of claim 13, wherein the at least one controller is further configured, in response to detecting the input at the fifth icon, to load a second display comprising a home screen count up counter and a home screen countdown counter.

15. The control system of claim 14, wherein the home screen count up counter is configured to resume the continual incrementing of the count up distance counter in response to determining that the count up distance counter was activated at the time of the input at the fifth icon, and wherein the home screen countdown counter is configured to resume the continual decrementing of the countdown distance counter in response to determining that the countdown distance counter was activated at the time of the input at the fifth icon.

16. A method for operating a train control system, comprising:
displaying a first display, wherein the first display includes a count up counter that counts up a distance traveled by a train, a countdown counter that counts down a distance to-be-traveled by the train, a first icon for activating the count up counter, a second icon for activating the countdown counter, a third icon for resetting the count up counter, and a fourth icon for resetting the countdown counter; and
in response to detecting an input at the first icon, continually incrementing a count value of the count up counter, based on a track distance covered by the train after the detecting of the input at the first icon;
in response to detecting an input at the second icon, continually decrementing a count value of the countdown counter based on a present train length and a track distance covered by the train after the detecting of the input at the third icon;
in response to detecting an input at the third icon, resetting the count value of the count up counter to a default value; or
in response to detecting an input at the fourth icon, resetting the count value of the countdown counter to the present train length.

17. The method of claim 16, further including:
displaying a fifth icon; and
removing the first display in response to detecting an input at the fifth icon.

18. The method of claim 17, further including:
displaying a sixth icon; and
removing the first display in response to detecting an input at the sixth icon.

19. The method of claim 18, further including:
in response to detecting the input at the sixth icon, loading a second display comprising a home screen count up counter and a home screen countdown counter.

20. The method of claim 19, wherein the loading of the second display further includes:
resuming the continual incrementing of the count up counter in response to determining that the count up counter was activated at the time of the input at the sixth icon; and
resuming the continual decrementing of the countdown counter in response to determining that the countdown counter was activated at the time of the input at the sixth icon.

* * * * *